United States Patent
Baraille et al.

(10) Patent No.: US 9,763,531 B2
(45) Date of Patent: Sep. 19, 2017

(54) PRESSURE COOKER PROVIDED WITH AN ELECTRONIC INFORMATION DEVICE

(75) Inventors: Eric Laurent Baraille, Fontaine les Dijon (FR); Pascal Murat, Fontaine les Dijon (FR)

(73) Assignee: SEB S.A., Ecully (FR)

( * ) Notice: Subject to any disclaimer, the term of this patent is extended or adjusted under 35 U.S.C. 154(b) by 1147 days.

(21) Appl. No.: 13/143,488

(22) PCT Filed: Jan. 14, 2010

(86) PCT No.: PCT/FR2010/050051
§ 371 (c)(1),
(2), (4) Date: Sep. 27, 2011

(87) PCT Pub. No.: WO2010/081994
PCT Pub. Date: Jul. 22, 2010

(65) Prior Publication Data
US 2012/0012010 A1    Jan. 19, 2012

(30) Foreign Application Priority Data

Jan. 15, 2009  (EP) ..................................... 0950237

(51) Int. Cl.
*A47J 27/08*   (2006.01)
*A47J 27/09*   (2006.01)

(52) U.S. Cl.
CPC ..................... *A47J 27/09* (2013.01)

(58) Field of Classification Search
CPC .................... A47J 27/08; A47J 27/0802; A47J 27/0804–27/0815; A47J 27/09

(Continued)

(56) References Cited

U.S. PATENT DOCUMENTS 4,567,763 A * 2/1986 Schiffbauer ................... 73/866.1
4,571,580 A * 2/1986 Winteler et al. .............. 340/594

(Continued)

FOREIGN PATENT DOCUMENTS

DE     29 10 789 A1   10/1980
DE     34 08 436 A1    9/1985
JP     2007 155281 A   6/2007

OTHER PUBLICATIONS

International Search Report mailed by the International Searching Authority (ISA/EP) on Jul. 16, 2010 in connection with PCT International Application No. PCT/FR2010/050051, filed Jan. 14, 2010.

(Continued)

*Primary Examiner* — Michael Laflame, Jr.
(74) *Attorney, Agent, or Firm* — John P. White; Cooper & Dunham LLP

(57) ABSTRACT

A household cooking utensil includes a first control member (9) mounted to move between a plurality of positions to enable the user to act on operation of the utensil. In addition, an information device (60) connected to the first control member (9) is configured to emit a signal corresponding to a first predetermined position of the first control member (9). The information device (60) and the first control member (9) are interconnected, for emitting the signal, via at least one sensor (10, 11, 12) and via an activator (13) which excites at least one sensor (10, 11, 12) remotely when the first control member (9) occupies the first predetermined position. Utensils for cooking food.

20 Claims, 3 Drawing Sheets

(58) Field of Classification Search
USPC .................. 99/276–277, 324, 342–344, 467; 219/401, 440, 431; 220/203.01, 202, 220/573.1; 122/452, 37, 451.1, 494, 122/13.01, 14.31
See application file for complete search history.

(56) References Cited

U.S. PATENT DOCUMENTS

| | | | | |
|---|---|---|---|---|
| 5,048,400 | A * | 9/1991 | Ueda et al. | 99/332 |
| 6,069,566 | A * | 5/2000 | Guatta | 340/584 |
| 6,154,201 | A * | 11/2000 | Levin et al. | 345/184 |
| 6,523,459 | B1 * | 2/2003 | Chameroy et al. | 99/337 |
| 7,571,675 | B1 * | 8/2009 | Cappadona et al. | 99/337 |
| 7,978,186 | B2 * | 7/2011 | Vassallo et al. | 345/184 |
| 8,546,731 | B2 * | 10/2013 | Pellerin et al. | 219/440 |
| 2008/0246470 | A1 * | 10/2008 | Kahlman et al. | 324/234 |
| 2009/0020021 | A1 * | 1/2009 | Rhetat et al. | 99/342 |
| 2009/0101643 | A1 * | 4/2009 | Rhetat | A47J 27/09 220/203.01 |

OTHER PUBLICATIONS

PCT International Publication No. WO 2008/154763 A, published Dec. 24, 2008 to AMC International Alfa Metalcraft Corporation AG and Hans-Jürgen Beck.

* cited by examiner

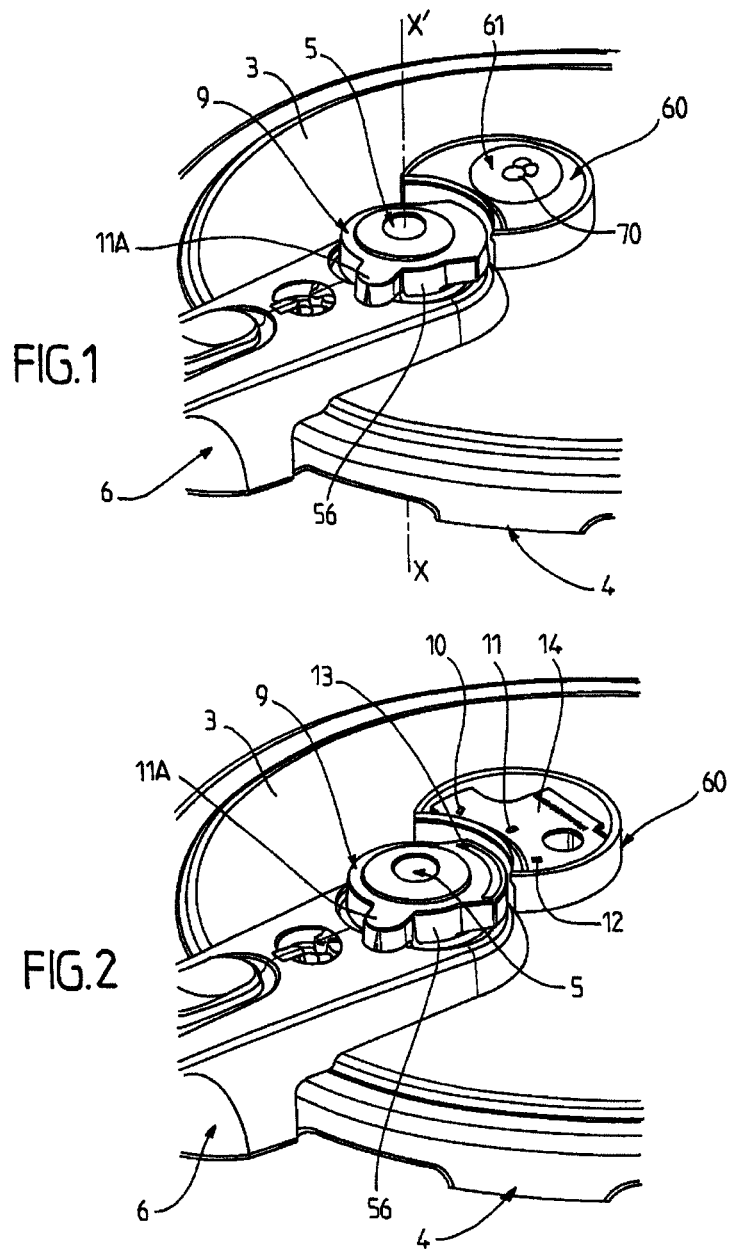

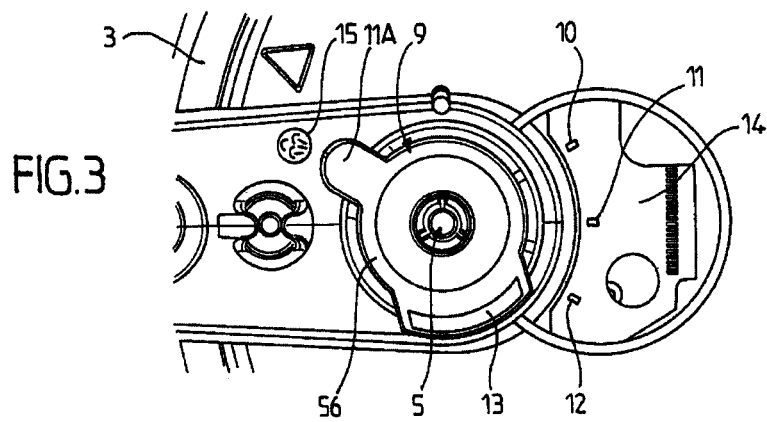
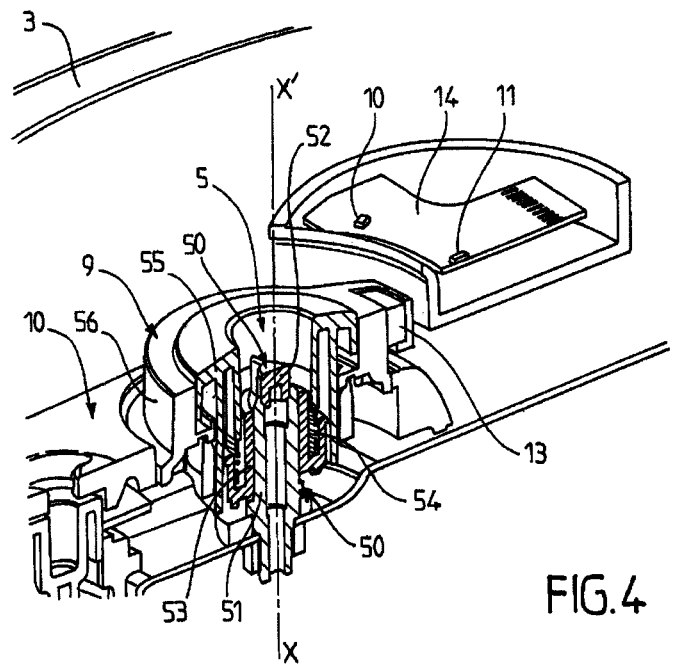

PRESSURE COOKER PROVIDED WITH AN ELECTRONIC INFORMATION DEVICE

This application is a §371 national stage of PCT International Application No. PCT/FR2010/050051, filed Jan. 14, 2010, claiming priority of French Patent Application No. 0950237, filed Jan. 15, 2009, the entire contents of each of which are hereby incorporated by reference into this application.

TECHNICAL FIELD

The present invention relates to the general technical field of household cooking utensils, and in particular to the sector of pressure cookers, i.e. of pressure-cooking utensils designed to enable food contained in them to be cooked under steam pressure.

The present invention relates more particularly to a household cooking utensil having firstly at least one control member mounted to move between a plurality of positions and designed to enable a user to act on operation of said utensil, and secondly an information device connected to said first control member for the purpose of generating a signal that is characteristic of the position of said first control member.

PRIOR ART

Household pressure cookers are well known. Such a pressure cooker is usually made up of a vessel and of a lid designed to be mounted and locked onto the vessel to form a sealed cooking enclosure therewith. Such a pressure cooker is conventionally designed to be subjected to the influence of a heat source (e.g. a hotplate) in such a manner as to enable the enclosure to be brought up to pressure and up to temperature, and thus to enable the food contained in said enclosure to be cooked under steam pressure.

Operation of such a known pressure cooker is governed by various members, such as, for example:
- locking/unlocking means capable of locking and unlocking the lid relative to the vessel;
- a pressure regulator valve making it possible to maintain the pressure inside the enclosure at a predetermined pressure level referred to as the "operating pressure"; and
- a decompression member, making it possible to cause the pressure inside the enclosure to drop, in particular at the end of the cooking process, so that the user can open the lid under acceptable safety conditions.

Each of these functions is controlled by the user by means of one or more corresponding control members designed to be actuated manually by the user.

In particular, a pressure-cooking utensil is known that is provided with a control member designed to enable the user to act on the pressure level prevailing inside the pressure enclosure, and, more precisely, enabling the user to place the utensil in a specific operating mode chosen from among the following modes:
- a leakage mode, in which the cooking enclosure is put into communication with the outside, with a view to causing the pressure inside the utensil to drop at the end of cooking, or, conversely, with a view to preventing the pressure from building up inside the utensil; and
- a plurality of cooking modes, each of which corresponds to a particular regulation pressure of greater or lesser magnitude and designed for certain types of food.

More precisely, in the above-mentioned prior art utensil, that control member is constituted by a ring mounted to turn about a vertical axis corresponding to the general axis of symmetry of the utensil.

More precisely, in that prior art utensil, the rotationally mounted ring interacts with the regulator valve to modify the rating thereof. That pressure selector ring thus makes it possible to select three pressure positions corresponding to three different ratings for said valve, and one opening position corresponding to a minimum rating for the valve, enabling said valve to open as soon as an extremely low pressure, compatible with safe opening of the lid, prevails inside the cooking enclosure. In that prior art utensil, the pressure selector ring is mounted to turn on a plate that is itself fastened to the lid. The plate is provided with four pictograms corresponding respectively to the opening position and to the three cooking positions that the pressure selector ring can take up. The pressure selector ring is itself provided with a reference mark that is designed to find itself facing a pictogram when the pressure selector ring is in the corresponding position. By putting the mark on the pressure selector ring into correspondence with one or another of the four pictograms present on the plate, the user can thus select a particular position corresponding either to the opening position, or to one of the three cooking positions that are provided. Going from one of the positions in question to another takes place, as explained above, by turning the pressure selector ring, thereby angularly moving the mark that can thus go from one pictogram to another. By means of this system for putting a mark incorporated in the pressure selector ring into correspondence with a stationary pictogram, the user is informed at all times of the position in which the pressure selector ring finds itself.

The user can thus be sure that the position of the pressure selector ring does indeed correspond to the use the user wishes to make of the utensil.

That prior art pressure cooker is generally satisfactory, but it nevertheless suffers from certain drawbacks.

The above-described known pressure cooker continuously leaves all of the pictograms present on the plate visible to the user, so that the user is not directly capable of seeing at a glance which instantaneous position the pressure selector ring is in, and thus which operating mode of the pressure cooker is selected. In order to access the information the user is seeking, said user is constrained to take positive steps to seek which pictogram is in register with the mark. It is thus frequent, in particular, for an uninitiated user, not to have that reaction and therefore not to notice that the position of the pressure selector ring does not correspond to the desired position.

Such poor ergonomics and lack of clarity of information can lead the user not to use the pressure cooker correctly (for example, the user thinks a pressure-cooking cycle has been launched whereas actually, without noticing, said user has left the pressure selector ring in the opening position), or indeed can lead, in the most critical situation and in combination with other factors, to a risk of accident, in particular by scalding. That problem can be exacerbated since the mark formed on the pressure selector ring, and the pictograms formed on the plate, can be relatively difficult to distinguish visually, so that it is naturally also difficult to distinguish whether or not they are in register with each other.

That is essentially due to the fact that, for reasons of industrial organization and of durability, the mark and the pictograms are generally formed merely by shaping (indented or projecting shapes) of the material respectively of the ring and of the cover, without any additional coloring.

The mark and the pictograms thus appear like tone on like tone relative to the part that carries them, which makes them very difficult to distinguish, in particular for a user who is uninitiated or who is visually impaired.

In addition, all of the pictograms being continuously visible to the user can distort the perception that the user has of the degree of difficulty involved in using the pressure cooker. The degree of difficulty is actually low or even zero, but the multiplicity of the visible symbols might suggest to certain users that the pressure cooker is a device that is extremely complex and hazardous to operate, and that therefore requires a lengthy and tedious learning process.

In order to remedy those various drawbacks, a system has been proposed that has a window in which a pictogram appears corresponding to the position of the control member.

Although such a window system can constitute progress compared with the above-described prior art, it is however not suitable for all designs of pressure cooker, and can, in addition, for certain designs and constructions, contribute to increasing the cost of the utensil and to complicating the design thereof.

In addition, such a window system does not constitute the ideal solution as regards informing the user, and does not make it possible to reassure completely all users concerning the use they make of their pressure cookers.

SUMMARY OF THE INVENTION

Objects assigned to the invention are consequently to remedy the various above-listed drawbacks and to propose a novel household cooking utensil, preferably constituted by a pressure cooker, that is of extremely reliable and compact design, and that is particularly simple, intuitive, ergonomic, and safe to use.

Another object of the invention is to propose a novel household cooking utensil, preferably constituted by a pressure cooker, that is of design based on principles that are particularly simple, well tried and tested, and inexpensive.

Another object of the invention is to propose a novel household cooking utensil, preferably constituted by a pressure cooker, that is particularly inexpensive and robust, and that is easy to manufacture.

Another object of the invention is to propose a novel household cooking utensil, preferably constituted by a pressure cooker, that avoids the user launching a cooking cycle without having previously selected a cooking position.

Another object of the invention is to propose a novel household cooking utensil, preferably constituted by a pressure cooker, the functionality features and the use of which are improved, and that enables the user to monitor the cooking cycle simply and effectively.

Another object of the invention is to propose a novel household cooking utensil, preferably constituted by a pressure cooker, that is of general design that is substantially as simple, light, and compact as in the prior art, while also making new functionality features possible.

The objects assigned to the invention are achieved by means of a household cooking utensil having firstly at least a first control member mounted to move between a plurality of positions and designed to enable the user to act on operation of said utensil, and secondly an information device connected to said first control member for the purpose of emitting a signal of audible and/or visible nature that is characteristic of at least a first predetermined position of said first control member, said information device and said first control member being interconnected, for the purposes of emitting said signal, via at least one sensor and via at least one activator designed to excite said sensor remotely when the first control member occupies said first predetermined position, so that the first control member reaching its first predetermined position causes said information device to emit said signal.

BRIEF DESCRIPTION OF THE DRAWINGS

Other objects and advantages of the invention appear in more detail on reading the following description given with reference to the accompanying drawings that are given by way of non-limiting and illustrative example, and in which:

FIG. 1 is a fragmentary perspective view of an implementation detail of a household pressure cooker of the invention;

FIG. 2 is a cutaway view of the implementation detail of FIG. 1;

FIG. 3 is a view from above of the implementation detail of FIG. 1, the first control member of the utensil being in an opening position enabling the pressure prevailing inside the utensil to be brought back to or maintained at a value compatible with safe opening of the utensil;

FIG. 4 is cutaway section view of the implementation detail of FIGS. 1 to 3;

BEST MANNER OF IMPLEMENTING THE INVENTION

Figure 5:
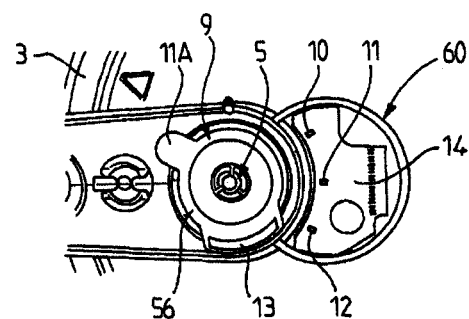
FIG. 5 is a view on a smaller scale of FIG. 3.

The invention relates to a household cooking utensil 1, i.e. a cooking utensil that is specifically designed to enable food to be cooked in a home environment. To this end, the utensil 1 of the invention is advantageously of a portable nature (i.e. it can be moved manually) and of an independent nature. Particularly preferably, and as shown in the figures, the household cooking utensil 1 is constituted by a pressure cooker, i.e. it forms a utensil for cooking food under pressure. In such a situation, the cooking utensil 1 is designed to cook food at a pressure level significantly higher than atmospheric pressure, and, for example exceeding atmospheric pressure by a value lying in the range 10 kilopascals (kPa) to 90 kPa.

Preferably, the utensil 1 of the invention is designed to be brought up to pressure exclusively under the effect of a heat source (regardless of whether that source is incorporated or external), without any external pressure being contributed.

The household cooking utensil 1 of the invention advantageously includes a vessel (not shown) forming a cooking receptacle for receiving the food to be cooked. The utensil 1 of the invention also advantageously includes a lid 3 that is designed to be mounted and locked onto the vessel so as to co-operate therewith to form a cooking enclosure that is substantially sealed, i.e. that is sufficiently airtight to enable the utensil 1 to be brought up to pressure. The lid 3 is preferably disk-shaped in overall shape, and, when said lid is mounted and locked onto said vessel, it advantageously extends in a mean plane that is substantially parallel to the mean plane in which the bottom of the vessel 2 extends. The lid 3 is preferably designed to be locked or unlocked on the vessel by locking/unlocking means for locking/unlocking the lid 3 relative to the vessel. Locking the lid 3 on the vessel enables the cooking enclosure to be brought up to pressure without any risk of the lid 3 suddenly coming off under the effect of the pressure, with all of the risks that such sudden blowing-off of the lid might cause to the user. The locking/unlocking means 4 may be of any type known to the person skilled in the art, and, in conventional manner, they are suitable for going between a locked position in which the lid 3 is secured to the vessel, and an unlocked position in which the lid 3 can be freely separated from the vessel. By way of example of such locking/unlocking means 4 that are usable in the context of the invention, mention can be made of locking/unlocking means having jaws or segments, it being understood that the invention is in no way limited to a particular type of locking/unlocking means 4.

When the locking/unlocking means 4 have jaws, the locking/unlocking means 4 for locking/unlocking the lid 3 relative to the vessel comprise two jaws mounted to move in radial translation over and relative to the lid 3 via corresponding drive arms that extend in diametrically opposite manner relative to the general axis of symmetry of the utensil 1. Such a locking system having jaws is well known to the person skilled in the art, so that it is not necessary to describe it in any further detail herein. In the variant shown in the figures, the locking/unlocking means 4 are constituted by a bayonet system that is well known per se, and that implements vessel and lid ramps that are interlockable under the effect of the lid 3 being turned against the vessel. Such a bayonet locking system is also well known to the person skilled in the art, so that it is not necessary to describe it in any further detail herein.

The household cooking utensil 1 of the invention also has at least a first control member 9 designed to enable a user to act on operation of the cooking utensil 1. This first control member 9 can thus enable the user to operate, at least in part, one or more of the functions of the pressure cooker 1, such as, merely by way of non-limiting illustrative example, locking/unlocking the lid 3 relative to the vessel and/or decompressing the cooking enclosure and/or setting the operating pressure level.

The first control member 9 in question is shaped so that it can be actuated by the user, i.e. so that it can be manipulated, preferably directly, by the user in such a manner that said user can manually control the corresponding function (and preferably the corresponding setting).

Preferably, the first control member 9 is designed to act directly on operation of the utensil 1, and preferably on the setting thereof, in response to manual action by the user.

The first control member 9 is mounted to move between a plurality of positions, each of which positions corresponds to a specific operation and/or configuration (setting) of the household cooking utensil 1. Preferably, each position that the first control member 9 can take up is predetermined and easily identifiable by the user. In other words, each position of the first control member 9 is advantageously indexed, and preferably marked by icons disposed on the lid 3 (an example of such an icon 15 is shown in FIG. 3). Advantageously, the first control member 9 is designed to be movable manually by the user between its various positions.

In the preferred variant shown in the figures, the first control member 9 is designed to enable the user to act on the pressure level prevailing inside the cooking enclosure.

For example, the first control member 9 is advantageously mounted to move between at least:

firstly an opening position enabling the pressure prevailing inside the cooking enclosure to be brought back to or maintained at a value compatible with safe unlocking of the lid 3; and secondly at least one cooking position allowing pressure to build up in said cooking enclosure to a pressure value incompatible with safe unlocking of the lid 3 relative to the vessel.

The second member 9 thus advantageously constitutes an operating member for controlling operation of the utensil 1, enabling the user to set the pressure level prevailing inside the cooking enclosure formed by the utensil 1 at a predetermined level, it being possible, for example, for this level to be greater than atmospheric pressure for the purposes of cooking food under steam pressure (cooking position), or to be substantially equal to or indeed slightly greater than atmospheric pressure in order to enable the lid 3 to be opened safely (opening position), without any risk of said lid being blown off under the effect of the pressure. The expression "pressure value that is compatible with safe unlocking of the lid" thus means, herein, a pressure value that is low enough to avoid any phenomenon of the lid 3 suddenly coming off while it is being unlocked by the user (opening of the jaws or disengagement of the ramps), which could give rise to a risk of bodily injury for the user. Such a pressure value compatible with safe unlocking of the lid 3 is, for example, chosen not to exceed atmospheric pressure by a value greater than 4 kPa.

The first control member 9 thus makes it possible to cause the utensil 1 to be decompressed (corresponding to the opening position) or to put said utensil 1 into a cooking configuration (corresponding to the cooking position). Preferably, the first control member 9 is suitable for reaching a plurality of distinct cooking positions, each of which corresponds to a specific operating pressure value, for a particular type of food. Thus, the user can, at will, place the control member 9 in its opening position, or in at least one cooking position, e.g. two, three, or four different cooking positions, each of which corresponds to a predetermined specific cooking level regulated by regulator means 5 that are described in more detail below.

Figure 6:
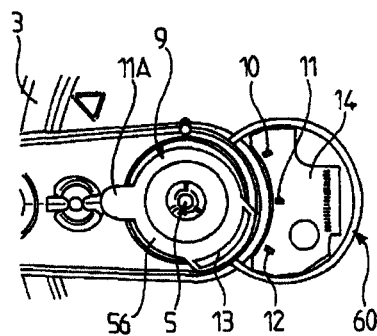
FIG. 6 is a view from above of the detail of FIG. 5, with the first control member in a first cooking position.
Figure 7:
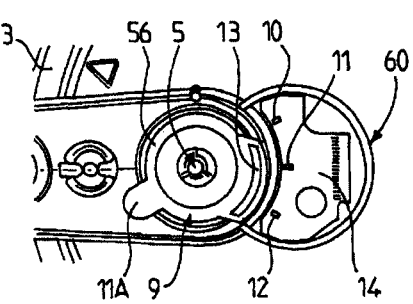
FIG. 7 is a view from above of the implementation detail of FIGS. 5 and 6, with the first control member in a second cooking position.

The first control member 9 thus preferably constitutes a pressure selector member making it possible not only to set the cooking pressure level but also to cause the utensil 1 to be compressed. For example, in the embodiment shown in the figures, the control member 9 constitutes a pressure selector member that is mounted to move between the following four positions:

an opening position that can also be referred to as a "decompression" position (shown in FIGS. 3 and 5), in which the inside of the enclosure is put into communication with the outside, via a leakage flow section that is sufficient for enabling the pressure prevailing inside the cooking enclosure to be brought back to or maintained at a value compatible with safe unlocking of the lid 3;

a first cooking position (shown in FIG. 6) allowing pressure to build up inside the cooking enclosure to a first predetermined value, regulated by the pressure regulator means 5 and optimized for cooking vegetables, of the green bean type, for example;

a second cooking position (shown in FIGS. 1, 2, 4, and 7) allowing pressure to build up inside the cooking enclosure to a second predetermined pressure value that is greater than the first predetermined pressure value, said second predetermined pressure value also being regulated by the pressure regulator means 5, and being optimized for starchy food, of the potato type, for example;

a third cooking position (shown in FIG. 8) allowing pressure to build up inside the cooking enclosure to a third predetermined pressure value that is greater than the second predetermined pressure valve and that is regulated by the pressure regulator means 5, said third predetermined pressure value being optimized for cooking meat, for example; and a fourth cooking position (shown in FIG. 9), allowing pressure to build up inside the cooking enclosure to a fourth predetermined pressure value that is greater than the third predetermined pressure value and that is optimized for cooking fish, for example, said fourth predetermined pressure value naturally also being regulated by the pressure regulator means 5.

Advantageously, in conventional manner, the pressure regulator means 5 comprise a rated regulator valve 50, i.e. said valve 50 is subjected to an adjustable calibrated return force continuously urging it back into a closure position, in which it interrupts any fluid communication between the inside of the cooking enclosure and the outside thereof. In the example shown in the figures, the rated regulator valve 50 includes a valve seat 51 that forms an axial duct passing through the lid 3 so as to put the inside of the enclosure into communication with the outside. The valve 50 also has a valve body, itself formed by a sphere 52 for closing the seat 51, and a sleeve 53 integral with the closure sphere 52 and mounted to slide axially on the seat 51. A spring 54 is interposed between the sleeve 53 and a cap 55, and the axial position of said cap, and more particular its height relative to the lid 3, is controlled by means of a conventional system of ramps, by the first control member 9.

The cap 55 thus makes it possible to set the compression of the spring 54, and thus to set the level the return force exerted by the spring 54 on the closure sphere 52, said level of return force corresponding to the rating of the valve 50.

The cap 55 is thus capable of moving between various positions corresponding to respective ones of the various cooking and decompression positions.

For example, the decompression position corresponds to a minimum rating for the valve, so that said valve is substantially subjected to its own weight only, which weight is very small, in order to enable the utensil 1 to be decompressed. Implementation of such a rating for the valve 50 is well known per se.

In this advantageous embodiment, the first control member 9 is mounted to turn on the lid 3, and makes it possible to control both the decompression and the rating by acting on the axial position of the cap 55. Preferably, the first control member 9 then comprises a rotationally mounted ring 56 mounted to turn on the lid 3, and provided with a control button 11A designed to be easy for the user to take hold of, and via which the user can turn the first control member 9, and thus the rotationally mounted ring 56. Such a rated valve architecture, described merely by way of non-limiting illustration, is well known per se in the field.

Advantageously, the utensil 1 has a second control member 6 designed to enable the user to act on the locking/unlocking of the lid 3 relative to the vessel, said second control member 6 being distinct from the first control member 9, i.e. the first control member 9 does not make it possible to act on the locking/unlocking of the lid 3 relative to the vessel 2. The second control member 6 may be of any type known to the person skilled in the art.

For example, when the locking/unlocking means 4 are constituted by a system having jaws, the second control member 6 may comprise a rotary lever or knob making it possible to cause the jaws to move radially. In the example shown in the figures (bayonet locking/unlocking means 4), the control member 6 may merely comprise a pair of handles respectively secured to or integral with the vessel and secured to or integral with the lid, and enabling the user to move the vessel and the lid so as to cause the ramps of the vessel and of the lid to inter-engage.

The household cooking utensil 1 of the invention also has an information device 60 connected to said first control member 9 so as to emit, preferably for the attention of the user, a signal 70 that is characteristic of at least a first predetermined position of said control member 9. In other words, there exists a functional link between the information device 60 and the first control member 9 so that the first control member 9 reaching its first predetermined position causes the information device 60 to emit the signal 70 characteristic (or, in other words, representative) of the first position in question. Thus, the information device 60 is connected to the first control member 9 so as to emit a signal 70 characteristic of at least a first predetermined position of said control member 9, as soon as said first predetermined position is reached by the first control member 9.

By means of this technical provision, the user (or an external device) is advantageously informed particularly reliably and intelligibly of the presence of the first control member 9 in its first predetermined position, which, naturally, corresponds to the utensil 1 being in a specific state, as explained below.

For example, when the first control member 9 is constituted, as shown in the figures, by a pressure selector controlling both the rating of the valve 50, and also decompression of the utensil 1, the first predetermined position may advantageously correspond to the opening position or to a cooking position.

Thus, in the example shown in FIG. 1, the first control member 9 is in its second cooking position, which, in this example, corresponds to said first predetermined position, said second cooking position in question causing the information device 60 to display a signal 70 constituted by an image (in this example, some potatoes) symbolizing the selected operating pressure (which, in this example, is particularly suitable for cooking starchy food).

Advantageously, as mentioned in the preceding example, the information device 60 is designed so that the signal 70 characteristic of the first predetermined position of the control member 9 is of audible and/or visible type. However, it is quite possible, in a variant that is not claimed and that forms an independent invention per se, for the signal 70 to be merely an electrical (or optical, etc.) signal that is imperceptible to the user, the signal 70 then being used to control an additional device. In the above-mentioned example (shown in FIG. 1) in which the first predetermined position corresponds to a cooking position suitable for cooking starchy food, the characteristic signal 70 is exclusively of the visible type. For this purpose, the information device 60 naturally advantageously includes a display screen 61 designed to display at least one sign (e.g. a pictogram symbolizing the type of food to which the pressure selected by the user is specifically suited) corresponding to said signal 70 characteristic of the first predetermined position of said first control member 9. The display screen 61 in question can be based on any technology well known to the person skilled in the art, and may, for example, be constituted by a screen of the Liquid-Crystal Display (LCD) type.

Advantageously, the information device 60 is also designed to emit an audible signal in addition to or instead of the visible signal displayed by the screen 61. It is also quite possible for the information device 60 and for the first control member 9 to be interconnected in such a manner that the information device 60 is designed to emit a signal characteristic of a single position of the first control member 9, no signal being emitted when the first control member 9 is not in that position which corresponds to the above-mentioned first predetermined position.

For example, the information device 60 may advantageously be designed to emit an alarm signal so long as the first control member 9 is in the opening position. Said alarm signal may, for example, consist of a continuous or periodic audible signal, preferably being of strident nature in order to warn the user of the fact that the first control member 9 is in an opening position. This avoids the user inadvertently launching a cooking cycle while the first member 9 is in the opening position and while the cooking enclosure cannot therefore be brought up to pressure.

Naturally, the alarm signal may combine generation of an alarm sound with display, on the screen 61, of an alarm sign that is optionally light-emitting and/or flashing so as to attract the user's attention.

Naturally, the above-mentioned emission of the alarm signal ceases as soon as the first control member 9 has left its opening position and finds itself in the cooking position. It is also possible for the information device 60 to be designed to emit an alarm signal so long as the first control member 9 is not in the cooking position (or not in any of the cooking positions when a plurality of such positions exist).

This avoids the user inadvertently launching a cooking cycle while the cooking position is improperly selected, the first control member 9 finding itself, for example, inadvertently between two predetermined cooking positions.

Naturally, it is quite possible for the first control member 9 and the information device 60 to be interconnected so that, for each position that the first control member 9 can occupy, the information device 60 emits a signal characteristic of the position in question. Thus, when the control member 9 can take up five different positions, namely an opening position (enabling the utensil 1 to be decompressed), and four cooking positions, each of which corresponds to a specific rating for the valve 50, the information device 60 emits a different signal for each of these positions, said signal being designed so that the user can distinguish very rapidly the position in which the first control member 9 finds itself.

In accordance with the invention, said information device 60 and said first control member 9 are interconnected, for the purposes of emitting said signal 70 characteristic of said first predetermined position, via at least one sensor 10, 11, 12, and via at least one activator 13 designed to excite said sensor 10, 11, 12 remotely when the control member 9 is in its first predetermined position, so that the first control member 9 reaching its first predetermined position causes the information device 60 to emit said signal 70. In other words, the information device 60 co-operates with the first control member 9 via a contactless functional link, set up by means of at least one activator 13 that can influence remotely, without direct contact or direct mechanical interaction, at least one sensor 10, 11, 12 in such manner that the sensor 10, 11, 12 excited in this way, responds by causing the information device 60 to emit the signal 70 characteristic of the first predetermined position.

Preferably, in order to improve the degree of accuracy of information delivered to the user (or to an external device), the information device 60 and the first control member 9 are interconnected via a plurality of sensors 10, 11, 12 (e.g. via three sensors, namely a left sensor 10, an intermediate sensor 11, and a right sensor 12), and via a single activator 13 designed to excite selectively one or more of said sensors 10, 11, 12, as a function of the position of the first control member 9.

The use of such a contactless functional link between the information device 60 and the first control member 9 makes it possible to impart a particularly reliable and robust nature to the utensil 1 while limiting the risk of dirt building up. The chosen technical solution also enables the complexity and the overall mechanical size of the utensil 1 not to be increased, and enables the information device 60 to remain entirely independent so that it is quite possible for said information device to be mounted removably on the utensil 1.

Advantageously, the activator 13 is incorporated in the first control member 9, i.e. it is integral with said first member 9 and is thus mounted to move therewith.

Advantageously, the sensor(s) 10, 11, 12 are mounted to stay in position in stationary manner on the utensil 1, and are preferably incorporated in the information device 60. Thus, in the particularly advantageous embodiment shown in the figures, the activator 13 turns with the first control member 9 while the sensors 10, 11, 12 remain stationary in predetermined positions.

Advantageously, and as shown in the figures, the activator 13 is designed to move in a substantially circular path about the axis of rotation X-X' of the first control member 9, the sensors being disposed in a circular arc that is substantially concentric about the axis of rotation X-X' of the first control member 9, at some distance from one another, so that the distance between the activator 13 and the sensors 10, 11, 12 varies as a function of the position occupied by the first control member 9, said distance making it possible, when it is small enough, for the sensors 10, 11, 12 to sense the excitation that is generated, preferably continuously, by the activator 13. Thus, the movement of the control member 9 between its different indexed positions makes it possible to bring the activator 13 and the sensors 10, 11, 12 closer together selectively in order to excite either a single one of said sensors, or a plurality of said sensors, or indeed none of said sensors.

Advantageously, the or each sensor 10, 11, 12 is a magnetic sensor, while the activator 13 comprises a magnet. Thus, each magnetic sensor 10, 11, 12 is capable of generating a signal, e.g. an electric signal in response to the sensor(s) 10, 11, 12 in question being subjected to the magnetic field exerted by the magnet of the activator 13. Advantageously, the (or each) sensor 10, 11, 12 is a magneto-resistive sensor, and is preferably of the Complementary Metal-Oxide-Semiconductor (C-MOS) type.

The use of a magneto-resistive sensor is particularly advantageous in that it tolerates a certain margin of error in the relative positioning of the sensor and of the activator for exciting said sensor by means of the activator. This means that the tolerance in the relative positioning of the activator 13 and of the sensor(s) 10, 11, 12 can be relatively large without adversely affecting the reliability of the information communicated to the user (or to any external device).

The use of C-MOS technology also makes it possible to have sensors 10, 11, 12 that are extremely light and compact, and that are easy to retrofit into existing designs of pressure cooker without it being necessary to make complex design changes. The use of such magnetic sensors of the magneto-resistive C-MOS type thus makes it possible, at low cost, to procure an information system that is extremely reliable (no risk of clogging with dirt, or of mechanical seizure) and that is easy to fit, the small size of the sensors 10, 11, 12 further making it possible to increase the number of said sensors without significantly influencing overall mechanical size. The use of other sensors (such as reed relays or switches) is however quite possible without going beyond the ambit of the invention.

Naturally, the invention is in no way limited to implementing an activator 13/sensor(s) 10, 11, 12 pair based on a magneto-resistive principle. For example, it is quite possible for the activator 13 to comprise a magnet while the (or each) sensor 10, 11, 12 is a magneto-inductive sensor. It is also quite possible for the activator 13 to comprise a light source while the (or each) sensor 10, 11, 12 is an optical sensor.

What is essential for the simplicity and reliability of the utensil 1 is to implement a non-mechanical functional link, without any direct contact, between the first control member 9 and the information device 60.

The following description is given essentially with reference to an activator 13 comprising a magnet and to magneto-resistive C-MOS-type sensors 10, 11, 12, for reasons of simplicity of description and of concision. In this example, and in a particularly advantageous embodiment, the information device 60 is in the form of an electronic module provided with a printed circuit 14 on which the sensors 10, 11, 12 are mounted, preferably directly. Preferably, as shown in the figures, the sensors are spaced apart uniformly and are disposed on a circular arc concentric with the circular path of the magnet 13, which magnet is advantageously of arcuate shape and concentric with its own path. In order to encode the position of the first control member 9 over the entire angular stroke thereof, the sensors 10, 11, 12 are spaced apart uniformly at an angular sector between them that is equal to or that is a fraction of the angular sector corresponding to the angular stroke of the first control member 9 between each of its positions. The printed circuit 14 is part of a processing unit that makes it possible to transform the signals emitted by the sensors 10, 11, 12 into a signal 70 that is advantageously understandable to the user, and that is, for example displayed on the screen 61 or emitted in the form of a sound by suitable means. Thus, when it is excited by the magnet of the activator 13, each sensor 10, 11, 12 emits a primary electric signal that is transformed by the processing unit (including the printed circuit 14) into said signal 70 characteristic of the position of the first control member 9.

The printed circuit 14 thus constitutes means for processing the signal that enable the electrical signal generated by each sensor 10, 11, 12 when it is subjected sufficiently to the magnetic field generated by the magnet of the activator 13 to be transformed into an information signal 70 that is preferably perceptible and understandable to the user.

Advantageously, the information device 60 firstly has detection means for detecting when a predetermined pressure value is reached inside the cooking enclosure, and secondly has a timer functionally linked to said detection means so as to trigger said timer as soon as said predetermined pressure value is detected. In other words, the information device 60 then has a timer that is triggered as soon as pressure-cooking starts. The detection means for detecting when a predetermined pressure value is reached may advantageously comprise a temperature sensor, in order to detect a temperature that represents the pressure prevailing inside the cooking enclosure.

For example, such a timer is described in Document FR 2 834 193, the contents of which are incorporated herein. The invention thus, merely by providing such a temperature detection timer with magneto-resistive sensors and by incorporating a magnet in the control member 9, makes it possible to increase considerably the functionality features of the timer, the screen and sound-producing means of which may, for example, be used to inform the user of the position occupied by the first control member 9.

By means of implementation of a wireless functional link, based on a sensor being remotely excited by an activator, it is thus possible to impart novel properties to prior art pressure cooker timers, without having to make complex or costly design changes.

The timer that is described in FR 2 834 193 is functionally linked to a temperature sensor designed to sense the increase in temperature resulting from steam passing through a steam outlet with which the pressure cooker incorporating the timer is provided.

Thus, in a particular embodiment, the present invention thus advantageously relates to a pressure-cooking utensil including firstly a decompression control member mounted to move between a decompression position and at least one cooking position, and secondly a temperature sensor functionally linked via an electric circuit to a timer, in a manner such as to trigger said timer as a function of the temperature detected by the pressure cooker, said electric circuit including a reed switch while the decompression control means are equipped with a magnet so that, when the decompression control means are in their decompression position, said magnet and said reed switch interact to interrupt the functional link between the temperature sensor and the timer.

Operation of a utensil 1 of the invention is described below with reference more particularly to FIGS. 5 to 9.

The user starts by placing the food in the vessel of the cooking utensil 1, and then puts the lid 3 on the vessel and locks it thereon by means of the bayonet system making it possible for the ramps of the vessel and of the lid to inter-engage. At this stage, the first control member 9 is in the opening position, while the information device 60 is switched off.

The user then prepares to use suitable means (e.g. push buttons) to program a pressure-cooking time on the information device 60, which, as mentioned above, also incorporates a timer function.

For this purpose, the user switches on (e.g. by actuating a switch or one of the above-mentioned push buttons) the information device 60, i.e. the user causes the printed circuit 14 to be electrically powered. Said printed circuit is thus capable of processing any primary electric signals that reach it from said sensors 10, 11, 12, depending on whether or not said sensors are excited by the magnet of the activator 13. At this stage, i.e. when the first control member 9 is in the opening position, the magnet of the activator 13 finds itself sufficiently far away from all of the sensors 10, 11, 12 for none of them to be excited. The printed circuit 14 thus detects that none of the sensors 10, 11, 12 are activated, thereby, in return, causing an alarm signal to be emitted that makes it possible to signal to the user that said user has not selected a pressure position.

For example, and as mentioned above, said alarm signal may consist of a relatively repetitive and strident audible signal, optionally associated with a visible signal (e.g. a flashing and/or light-emitting signal) appearing on the screen 61.

Faced with this alarm signal, the user then thinks to manipulate the first control member 9 so as to bring it into one of the four predetermined pressure positions provided on the utensil 1 shown in the figures. Thus, if the first control member 9 is brought into its first cooking position, shown in FIG. 6, the magnet of the activator 13 is sufficiently close to the right sensor 12 to excite it, but sufficiently far away from the other two sensors 10, 11 for them not to be excited.

The printed circuit 14 thus detects that the right sensor 12 is excited while the other two sensors 10, 11 are not, thereby causing a specific signal to be emitted that is characteristic of this first cooking position.

Figure 8:
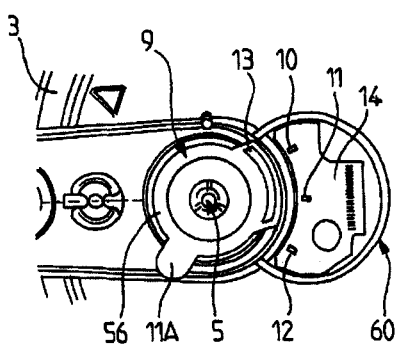
FIG. 8 is a view from above of the detail of FIGS. 5 to 7, with the first control member in a third cooking position.
Figure 9:
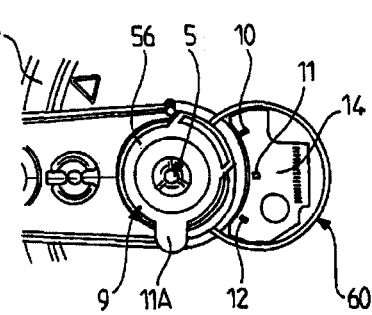
FIG. 9 is a view from above of the detail of FIGS. 5 to 8, with the first control member in a fourth cooking position.

If the user selects the second cooking position (shown in FIG. 7), the magnet of the activator 13 is sufficiently close to the intermediate sensor 11 and to the right sensor 12 to excite them, but sufficiently far away from the left sensor 10 for said left sensor not to be excited. The printed circuit 14 thus detects that the intermediate sensor 11 and the right sensor 12 are excited, thereby causing a signal characteristic of the second cooking position to be emitted. If the first control member 9 is brought to its third cooking position, as shown in FIG. 8, the magnet of the activator 13 is sufficiently far away from the right sensor 12 not to excite it, but sufficiently close to the left sensor 10 and to the intermediate sensor 11 to excite them.

The printed circuit 14 thus detects this particular excitation configuration and, in return, causes a specific signal to be emitted that is characteristic of said third cooking position. Similar logic is implemented with the fourth cooking position, in which only the left sensor 10 is excited, thereby causing a signal characteristic of said fourth cooking position to be generated.

Thus, the activator/sensor(s) system provided by the invention, in particular in the preferred variant shown in the figures, makes it possible to encode the position of the first control member 9 numerically, and thus to generate electrical, electronic, visible and/or audible information that is characteristic of the position occupied by the first control member 9.

In an alternative embodiment (not shown in the figures), the activator 13 does not have a single magnet, but rather a plurality of distinct magnets that are spaced apart angularly, in order to make additional encoding combinations possible. For example, the use of two angularly spaced-apart magnets for forming the activator 13 could make it possible to excite the left sensor 10 and the right sensor 12 without exciting the intermediate sensor 11, which is not possible in the above-describe variant.

The invention makes it possible to guide the user accurately and reliably in using the cooking utensil 1, which is particularly reassuring for the user.

SUSCEPTIBILITY OF INDUSTRIAL APPLICATION

The invention is susceptible of industrial application in designing, manufacturing, and using household cooking utensils.

What is claimed is:

1. A household cooking utensil (1) having firstly at least a first control member (9) mounted to move between a plurality of positions and configured to enable the user to act on operation of said utensil (1), and an information device (60) connected to said first control member (9) and configured to emit a signal (70) of audible and/or visible nature that is characteristic of at least a first predetermined position of said first control member (9), said information device (60) and said first control member (9) being interconnected, via at least one sensor (10, 11, 12) and via at least one activator (13) configured to excite said sensor (10, 11, 12) remotely when the first control member (9) occupies said first predetermined position, so that the first control member (9) reaching its first predetermined position causes said information device (60) to emit said signal (70), said utensil (1) being constituted by a pressure cooker comprising a vessel, a lid, locking/unlocking means for locking/unlocking the lid relative to the vessel to form a cooking enclosure, and a regulator valve (5) for regulating the pressure inside the enclosure at a first predetermined value, the first control member being configured to include at least one of the following (i) and (ii): (i) control the regulator valve (5) and is mounted to move between at least (a) a decompression position, in which the inside of the enclosure is put into communication with the outside, for enabling the pressure prevailing inside the cooking enclosure to be brought back to or maintained at a value compatible with safe unlocking of the lid (3), and (b) a first cooking position allowing pressure to build up inside the cooking enclosure to said first predetermined value regulated by the regulator valve (5); and (ii) control the locking/unlocking means for enabling the user to act on the lock/unlocking of the lid relative to the vessel.

2. A utensil (1) according to claim 1, wherein said activator (13) is incorporated in the first control member (9).

3. A utensil (1) according to claim 1, wherein said sensor (10, 11, 12) is incorporated in the information device (60).

4. A utensil (1) according to claim 1, wherein said sensor (10, 11, 12) is a magneto-resistive sensor.

5. A utensil (1) according to claim 4, wherein said sensor (10, 11, 12) is a sensor of the C-MOS type.

6. A utensil (1) according to claim 4, wherein said activator (13) comprises a magnet.

7. A utensil (1) according to claim 1, wherein said information device (60) and said first control member (9) are interconnected via:
a plurality of sensors (10, 11, 12); and
a single activator (13) to excite selectively one or more of said sensors (10, 11, 12) as a function of the position of the first control member (9).

8. A utensil (1) according to claim 1, wherein the utensil is constituted by a pressure cooker comprising a vessel and a lid (3) to be locked on said vessel to form a cooking closure therewith.

9. A utensil (1) according to claim 8, wherein the first control member (9) permits the user to act on the pressure level prevailing inside the cooking enclosure.

10. A utensil (1) according to claim 9, characterized in that it wherein the utensil (1) has a second control member (6) configured for the user to act on the locking/unlocking of the lid (3) relative to the vessel, said second control member (6) being distinct from the first control member (9).

11. A utensil (1) according to claim 9, wherein the first control member (9) is mounted to move between at least firstly an opening position enabling the pressure prevailing inside the cooking enclosure to be brought back to or maintained at a value compatible with safe unlocking of the lid (3), and secondly at least one cooking position allowing pressure to build up inside said cooking enclosure to a pressure level incompatible with safe unlocking of the lid (3).

12. A utensil (1) according to claim 11, wherein the information device (60) emits an alarm signal so long as the first control member (9) is in the opening position.

13. A utensil (1) according to claim 9, wherein the information device (60) comprises firstly detection means for detecting when a predetermined pressure value is reached inside the enclosure, and secondly a timer functionally linked to said detection means so as to trigger said timer as soon as it is detected that said predetermined pressure value has been reached.

14. A utensil (1) according to claim 1, wherein the information device (60) further comprises a display screen (61) that displays at least one sign corresponding to said signal (70) characteristic of the first predetermined position of said first control member (9).

15. A utensil (1) according to claim 3, wherein said sensor (10, 11, 12) is a magneto-resistive sensor.

16. A utensil (1) according to claim 5, wherein said activator (13) comprises a magnet.

17. A utensil (1) according to claim 10, wherein the first control member (9) is mounted to move between at least firstly an opening position enabling the pressure prevailing inside the cooking enclosure to be brought back to or maintained at a value compatible with safe unlocking of the lid (3), and secondly at least one cooking position allowing pressure to build up inside said cooking enclosure to a pressure level incompatible with safe unlocking of the lid (3).

18. A utensil (1) according to claim 10, wherein the information device (60) comprises firstly detection means for detecting when a predetermined pressure value is reached inside the enclosure, and secondly a timer functionally linked to said detection means so as to trigger said timer as soon as it is detected that said predetermined pressure value has been reached.

19. A utensil (1) according to claim 11, wherein the information device (60) comprises firstly detection means for detecting when a predetermined pressure value is reached inside the enclosure, and secondly a timer functionally linked to said detection means so as to trigger said timer as soon as it is detected that said predetermined pressure value has been reached.

20. A utensil (1) according to claim 12, wherein the information device (60) comprises firstly detection means for detecting when a predetermined pressure value is reached inside the enclosure, and secondly a timer functionally linked to said detection means so as to trigger said timer as soon as it is detected that said predetermined pressure value has been reached.

\* \* \* \* \*